(12) United States Patent
Atkins

(10) Patent No.: US 6,614,881 B1
(45) Date of Patent: Sep. 2, 2003

(54) REMOTELY OPERABLE TELECOMMUNICATIONS CONDUCTOR TEST CIRCUIT AND METHOD FOR USING THE SAME

(75) Inventor: Ian Paul Atkins, Cary, NC (US)

(73) Assignee: Tyco Electronics Corporation, Middleton, PA (US)

( * ) Notice: Subject to any disclaimer, the term of this patent is extended or adjusted under 35 U.S.C. 154(b) by 223 days.

(21) Appl. No.: 09/690,210

(22) Filed: Oct. 17, 2000

(51) Int. Cl.[7] .......................... H04M 1/24; H04M 3/08; H04M 3/22
(52) U.S. Cl. .......................... 379/22; 379/21; 379/29.01
(58) Field of Search .......................... 379/1.01, 19, 21, 379/24, 27.02, 27.03, 27.05, 27.06, 29.03–29.04

(56) References Cited

U.S. PATENT DOCUMENTS

| | | |
|---|---|---|
| 4,309,578 A | 1/1982 | Ahuja |
| 4,700,380 A | 10/1987 | Ahuja |
| 4,710,949 A | 12/1987 | Ahuja |
| 4,945,559 A | 7/1990 | Collins et al. |
| 5,465,188 A | 11/1995 | Pryor et al. |
| 5,604,785 A | 2/1997 | Pryor et al. |
| 5,625,519 A | 4/1997 | Atkins |
| 5,651,048 A | 7/1997 | Leeuw |
| 5,652,575 A | 7/1997 | Pryor et al. |
| 5,768,341 A | 6/1998 | Pryor et al. |
| 5,818,926 A | 10/1998 | Challis |
| 6,212,258 B1 * | 4/2001 | Bella et al. |

FOREIGN PATENT DOCUMENTS

| | | |
|---|---|---|
| EP | 0552265 B1 | 7/1996 |
| EP | 0606284 B1 | 7/1996 |
| EP | 0593588 B1 | 3/1997 |
| EP | 0566594 B1 | 5/1997 |

* cited by examiner

Primary Examiner—Duc Nguyen
(74) Attorney, Agent, or Firm—Myers Bigel Sibley & Sajovec

(57) ABSTRACT

Telecommunications conductor wire pair test circuits are provided. The test circuits include a switch electrically coupled to the wire pair. The switch has a first position in which the test circuit provides an open circuit across the wires of the wire pair and a second position in which the test circuit is detectable across the wires of the wire pair. An energy storage cell is electrically coupled across the wires of the wire pair so as to charge the energy storage cell when the switch is in the second position. The switch is powered by the energy storage cell. An energy monitor circuit is electrically coupled to the energy storage cell which detects an energy level of the energy storage cell. A switch control circuit switches the switch from the first position to the second position responsive to the energy monitor circuit. In other embodiments, the switch is a relay and the energy monitor circuit is optionally included. Methods are also provided using the test circuit.

33 Claims, 6 Drawing Sheets

REMOTELY OPERABLE TELECOMMUNICATIONS CONDUCTOR TEST CIRCUIT AND METHOD FOR USING THE SAME

FIELD OF THE INVENTION

The present invention relates generally to telecommunications and, more particularly, to telecommunication conductor test circuits and methods for using such telecommunication conductor test circuits.

BACKGROUND OF THE INVENTION

Network Interface Devices (NIDs) are used by telecommunications companies to connect connector wires of a multi-core cable to service wires that extend to customer residences or places of business. Such NIDs are typically mounted outdoors at a customer residence or place of business. The telecommunications company multi-core cable typically extends from a switching center commonly referred to as a central office (CO) to provide communications service to one or more neighborhoods including a plurality of customers. Thus, once a pair of wires, typically referred to as tip and ring lines, from the multi-core cable are connected to a customer's service wires, a connection is provided between the customer and the CO as will now be described.

Referring to the schematic illustration of FIG. 1, a typical telephone company (Telco) telecommunications multi-conductor cable 20 extends from the Telco central office (CO) 22 to feed pedestals in a neighborhood or neighborhoods. The Telco telecommunications conductor cable 20 may include 900 or more pairs of telecommunications conductor wires. At a splice 24, one or more of the pairs of telecommunications wires are accessed. FIG. 1 illustrates a single pair including a tip conductor 26 and ring conductor 28 which are spliced at the splice 24 into a cable extending to pedestal 32. Note that, while only one pair of wires 26, 28 is illustrated, the splice typically includes bridge connections for 25 pairs of wires with a 25 pair cable 30 extending from the splice 24 to the pedestal 32.

In the pedestal 32, the telecommunications wire pair 26, 28 is connected to a terminal block 34. It is further to be understood that, while only one terminal block 34 is illustrated, a terminal block assembly including a plurality of module stations, which may share a common base, is typically provided for all the pairs of the cable 30. The terminal block 34 provides a connection point between telecommunications wire pair 26, 28 and the customer service wires 36. A telecommunications connection may thus be provided between the customer 38 and the Telco central office 22.

As is further shown in the illustration of FIG. 1, an additional demarcation point between incoming telephone company lines and customer service wires is provided by the NID 40 which may be mounted on the premises of the customer 38. The NID 40 typically includes one or more terminal connection devices which are also typically referred to as network interface devices. The connector device in the NID 40 typically includes a removable jumper cable allowing convenient breaking of the connection between the customer service wires inside the premises of the customer 38 and the telephone company side of the telecommunications infrastructure. The removable jumper demarcation may use an RJ-type connector which may further provide a test port isolating customer wires from the telephone company wires. Such devices are illustrated, for example, in U.S. Pat. No. 4,945,559.

The telecommunications infrastructure as described with reference to FIG. 1 is generally directed to providing conventional voice services to a plurality of customers 38. The conductors 20, 26, 28, 36 are typically copper wires well suited to supporting voice communications. With the increased popularity of data based communications, which are typically digital transmissions, additional demands are being placed on the telephone infrastructure. For example, the Internet is growing increasingly popular with expanding information and services available to customers utilizing the Internet. The increase in content and opportunity for utilization of the Internet further may make it desirable to provide increasing data rates for communications over the telephone infrastructure.

While conventional modems designed for use over the telephone infrastructure are suited to the systems described with reference to FIG. 1, they are typically limited in their communication rate, for example, to 56 kilo bits per second (kbps). More recently, the digital subscriber line (DSL), very high data rate DSL (VDSL), asymmetrical DSL (ADSL) and other DSL technologies have been proposed for bringing higher band width information communications to homes and small businesses over ordinary copper telephone lines such as the cable infrastructure illustrated in FIG. 1. The DSL approach is intended to provide downstream communications connections at data rates from approximately 1.544 megabits per second (mbps) through 384 kbps. However, the data rate available for any individual customer 38 may depend upon a variety of characteristics of the Telco infrastructure including the distance between the customer 38 and the Telco central office 22.

The conductor wire pairs utilized for providing either analog and/or digital services between a customer 38 and the Telco central office 22 are typically tested to insure that they are of sufficient quality to provide the desired services. For example, one known approach for testing at a demarcation point of a customer premises, such as the NID 40, is the use of the maintenance termination unit (MTU). One known type of MTU is typically referred to as a half ringer. A half ringer places a resistor and a capacitor in series across the incoming telecommunications wire pair at the demarcation point to the customer premises. A typical half ringer will utilize a 470 kilo-ohm (k$\Omega$) resistor in series with a one micro farad ($\mu$F) capacitor. The presence of the MTU may be remotely detected from the telephone company's central office. Accordingly, when a customer complaint is received, an individual customer wire pair can be tested remotely and the telephone company may be able to determine if the wiring problem is on the customer's wires or the telephone company's wires without the necessity of dispatching a service truck to the customer premises.

The MTU may be detected when the customer wires are disconnected at the test point, for example, by applying a voltage and detecting the current flow through the MTU circuit. An alternating current signal is utilized to detect the circuit as, under normal DC line conditions, no current flows through the MTU, thus avoiding unnecessary current flows through the MTU when it is not in use. Furthermore, as a typical customer telephone in an off hook condition appears as approximately 2 k$\Omega$, the MTU, during transmission of voice signals, generally has no detectable impact on the perceived quality of the phone service. However, a half ringer has a disadvantage in that, when a customer phone is off hook, the typically 2 k$\Omega$ characteristic of the phone is detected rather than the MTU. Such MTUs may further provide an undesirable degradation in the performance characteristics of the wire pair under high frequency signal transmission conditions, such as those utilized with DSL service. An example of such an MTU is described generally in U.S. Pat. No. 4,309,578.

A further approach to providing an MTU includes the use of a solid state thyristor (or triac) in line for one of the wire pair, typically the ring line. The gate of the thyristor is coupled back to the ring input, typically through a 20 volt zener diode. Thus, when a line voltage of greater than about 20 volts is presented across the wire pair, the thyristor is activated and the circuit is active for phone service. During test conditions, the test circuit may be presented with a lower voltage, such as 10 volts, across the wire pair which does not turn on the thyristor (or triac) and thereby, essentially, disconnects the customer phone. Current flow may then be monitored and if current flows at a low (e.g., 10 volt) condition, this may be understood to indicate a short or other defect in the telco (company side) lines. As with the previously described RC circuit type of MTU, a thyristor based MTU may provide for detection of whether a problem exists on the customer or Telco side of the wires without the necessity of dispatching a service truck to the customer location. Furthermore, the thyristor based MTU generally is not susceptible to whether or not the customer has a phone off hook during the test. However, for DSL type services, the thyristor's inherent capacitance and distortion characteristics may distort the higher frequency signals typically used for data communications. Furthermore, different bias voltages may be utilized for DSL line service, for example, 20 volts as contrasted with the 48 volts typically utilized for analog voice services. An example of a thyristor based MTU is described in U.S. Pat. No. 4,700,380.

One known approach to line testing on digital service lines utilizes the intelligence of digital modem devices coupled to the digital service lines. For example, the test circuit located at the telephone company central office may share a common communication protocol with such a connected digital modem and exchange communications designed to establish a quality of service as is known in the art. Such an intelligent digital modem capability may provide inherent error checking as well as a variety of other line test capabilities. However, such a digital modem is typically not already installed at the time service is requested by existing analog voice customers to add digital service or on the activation of a new line.

In a typical transaction where a customer desires to add DSL service, the customer contacts a DSL supplier to request service. While some telephone company related entities, typically referred to as a competitive local exchange carrier (CLEC), independent local exchange carrier (ILEC) or a regional Bell operating company (RBOC), act as DSL suppliers, many DSL suppliers are independent. Such an independent DSL supplier typically is provided a portion of connection circuitry at the Telco central office or other location in the circuit downstream from the customer. The DSL supplier further may include a digital test head circuit within the DSL supplier circuitry. The DSL supplier circuitry for an independent is typically connected into the CLEC/ILEC/RBOC telecommunication circuitry through a cross connect. Under such circumstances the independent DSL supplier, responsive to the request from the customer, buys a line to the customer from the CLEC/ILEC/RBOC who controls the last leg infrastructure to the customer from the central office. As part of the transaction, the CLEC/ILEC/RBOC typically agrees to condition the sold line as part of the transaction. Such conditioning typically includes removing all the analog protectors, coils, half ringers, etc. provided on the line for purposes of analog services, which devices typically deteriorate digital communication services. The CLEC/ILEC/RBOC then assigns the appropriate wire pair to the independent DSL supplier through the cross connect. After the assignment, the independent DSL supplier tests the service line with its digital test head which test typically requires the existence of an open circuit at the customer location. If a line tests successfully, a truck may be dispatched to the customer location to hook up DSL modem hardware.

A problem for such independent DSL suppliers may occur where a detected DSL open circuit is not at the correct location (i.e., the desired customer location). Thus, potentially causing the testing to incorrectly indicate that the customer line is prepared and ready for dispatch of an installation service truck or a modem for customer installation. The customer may then initially obtain a hook up of his service either through a service truck or self-install only to discover that the service does not work. A typical problem resulting in this condition is where the CLEC/ILEC/RBOC service personnel identified that the cable from the Telco pedestal 32 to the customer 38 is not fit for digital service and pulled the line at the pedestal 32 on the expectation that a later service worker would install a suitable new line. Such a polled circuit may then cause an open circuit at the pedestal 32 resulting in an invalid test by the digital test head. Thus, it would be desirable to have an identifiable test circuit at the customer 38 which could be detected from the digital test head while still providing an open circuit for purposes of line testing by the independent DSL supplier.

SUMMARY OF THE INVENTION

In embodiments of the present invention, telecommunications conductor wire pair test circuits are provided. The test circuits include a switch electrically coupled to the wire pair. The switch has a first position in which the test circuit provides an open circuit across the wires of the wire pair and a second position in which the test circuit is detectable across the wires of the wire pair. An energy storage cell is electrically coupled across the wires of the wire pair so as to charge the energy storage cell when the switch is in the second position. The switch is powered by the energy storage cell. An energy monitor circuit is electrically coupled to the energy storage cell which detects an energy level of the energy storage cell. A switch control circuit switches the switch from the first position to the second position responsive to the energy monitor circuit.

In other embodiments of the present invention, the switch is a relay and may be a latching relay such as a bistable relay. The energy monitor circuit may be a micropower circuit powered by the energy storage cell. In various embodiments, the energy storage cell is electrically decoupled from a first one of the wires of the wire pair in the first ("open" or "set") position so as not to charge the energy storage cell when the relay is in the first position. The switch control circuit switches the relay from the first position to the second position at a reset level and switches the relay from the second position to the first position responsive to the energy monitor circuit at a set level. In such embodiments, the set level is greater than the reset level.

In further embodiments of the present invention, the energy monitor circuit includes a first monitor circuit that controls switching of the relay from the first position to the second position and a second monitor circuit that controls switching of the relay from the second position to the first position. A second relay having a first position that deactivates the second monitor circuit when the first relay is in its first position and a second position when the first relay is in its second position may be included in the test circuit.

In other embodiments of the present invention, the switch control circuit includes a set switch circuit that switches the relay(s) from the second position to the first position and a reset switch circuit that switches the relay(s) from the first position to the second position. A current input source of the reset switch circuit is decoupled from the energy storage cell by one of the relays in the second position and coupled to the energy storage cell in the first position. The second monitor circuit may have a determined hysteresis. The set switch circuit and the reset switch circuit may include solid state switch devices.

In further embodiments of the present invention, the test circuit also includes a signal conditioning circuit coupling one of the wires to the first relay. The energy storage cell may be a capacitor having a capacitance selected to provide a determined discharge time for draining the capacitor to the reset level while powering the test circuit while the first relay is in the first position. The capacitor may further be selected to provide a determined charge time for charging the capacitor to the set level while the first relay is in the second position. The signal conditioning circuit may include a tuning resistor selected to provide the determined charge time for charging the capacitor to the set level while the first relay is in the second position. A bridge rectifier circuit may be electrically coupled between one of the wires of the wire pair and the first relay so that the test circuit is responsive to positive and negative polarity signals across the wire pair. A voltage regulator may be electrically coupled between the energy storage cell and the energy monitor circuit.

In other embodiments of the present invention, the latching relay includes an output electrically coupled to a first one of the wires of the wire pair through the energy storage cell. The first switched input is connected to a second one of the wires of the wire pair. The output is connected to the first switched input in the second position so as to charge the energy storage cell when the relay is in the first position and disconnected from the first switched input in the first position so as to provide a galvanically isolating open circuit across the wire pair.

In further embodiments of the present invention, a telecommunications conductor wire pair test circuit is provided including a relay electrically coupled to the wire pair. The relay has a first position in which the test circuit provides an open circuit across the wires of the wire pair and a second position in which the test circuit is detectable across the wires of the wire pair. An energy storage cell is electrically coupled across the wires of the wire pair so as to charge the energy storage cell when the switch is in the second position. The relay is powered by the energy storage cell. A switch control circuit switches the relay from the first position to the second position.

In yet other embodiments of the present invention, methods are provided for testing a telecommunications conductor wire pair. A switching test circuit is provided connected to the wire pair. An energy storage cell of the test circuit is charged with energy carried by the wire pair. An energy level of the energy storage cell is monitored. The connection of the test circuit to the wire pair is opened to interrupt charging of the energy cell responsive to detection of a set energy level of the energy storage cell during charging of the energy storage cell. The connection of the test circuit to the wire pair is closed using energy stored in the energy storage cell, to allow re-charging of the energy storage cell, responsive to detection of a reset energy level of the energy storage cell during discharging of the energy storage cell. The switching circuit may include a latching relay so that opening of the connection using the latching relay provides a galvanically isolating open circuit across the wire pair. In various embodiments, operations may include applying a voltage to the wire pair, detecting the test circuit while the connection of the test circuit is closed, detecting the open circuit across the wire pair while the connection of the test circuit is open and testing the telecommunications conductor wire pair while the connection of the test circuit is open. The test circuit may then be removed.

DETAILED DESCRIPTION OF THE INVENTION

Figure 1:
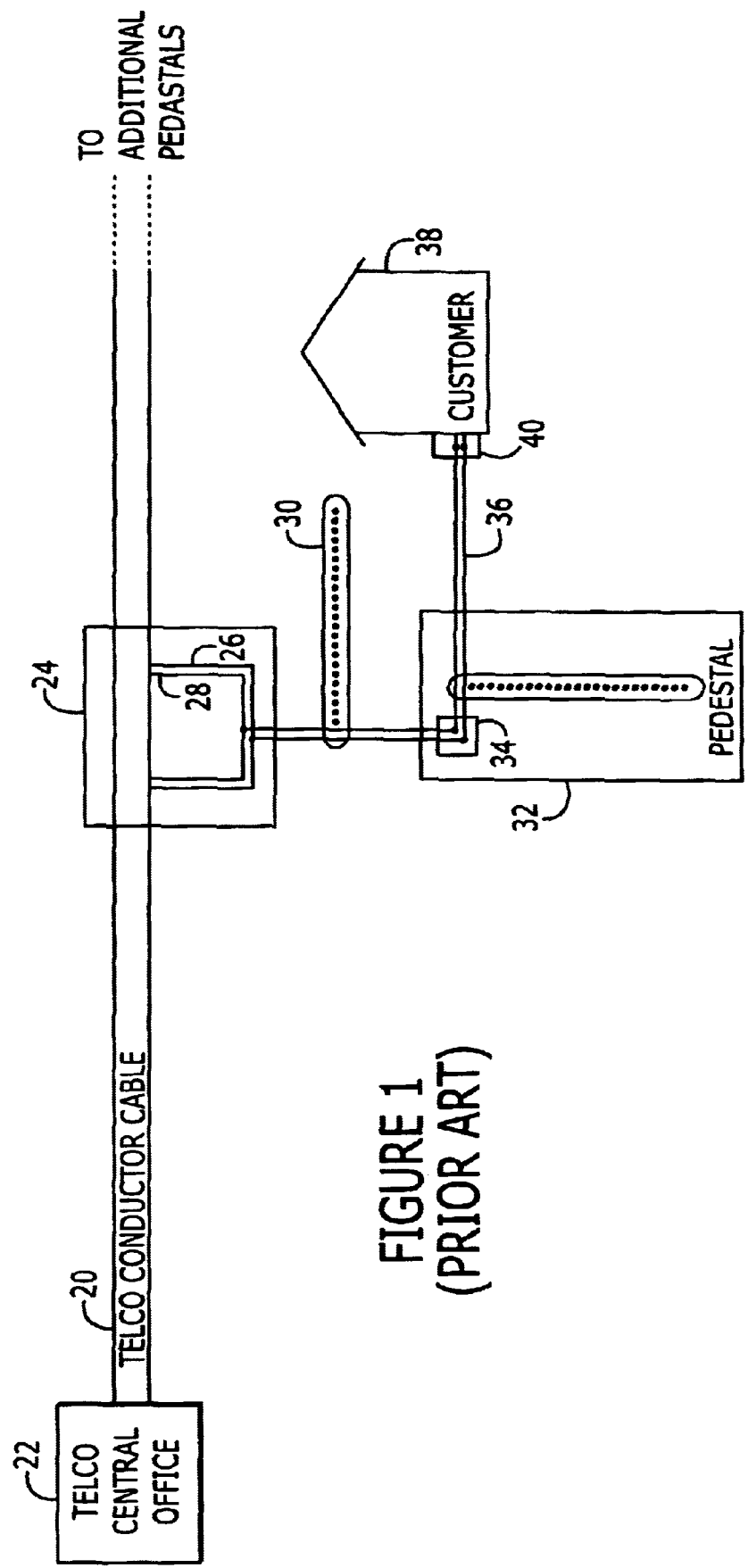
FIG. 1 is a schematic view of a telecommunications conductor cable from a central office to a network interface device connecting to customer service wires according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the drawings, layers, objects and regions may be exaggerated for clarity.

Figure 2:
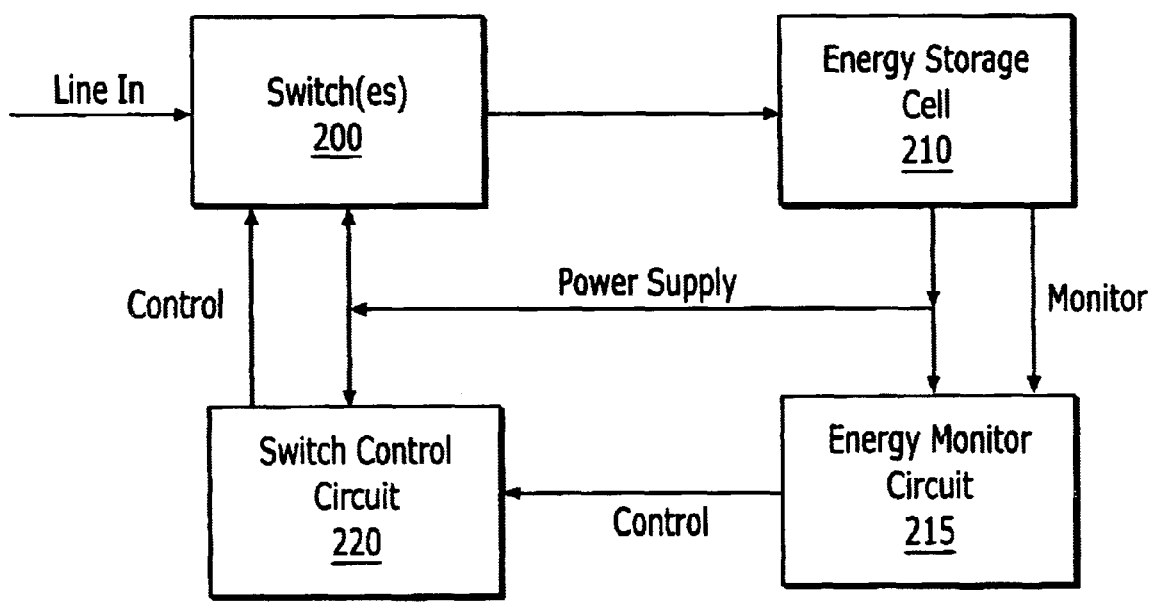
FIG. 2 is a block diagram of a telecommunications conductor wire pair test circuit according to embodiments of the present invention.

The present invention will now be described with reference to the embodiments illustrated in the figures. Referring first to FIG. 2, a telecommunications conductor wire pair test circuit according to embodiments of the present invention includes a switch (or switches) 200 which electrically couples to the line in wire pair. It is to be understood that an open circuit across the line in wire pair may be provided by switching out both the tip and ring lines of the wire pair or switching out only one of the connections where the customer service wires downstream of the test demarcation point themselves present an open circuit. For purposes of describing the present invention herein, various embodiments will be described utilizing a single switch to provide an open circuit for purposes of understanding the present invention. However, it is to be understood that the present invention further encompasses embodiments in which both wires of the wire pair are switched to an open condition.

The switch 200 has a first position in which the test circuit provides an open circuit across the wires of the wire pair and a second position in which the test circuit is detectable across the wires of the wire pair, for example, by a DSL supplier digital test head at the telephone company central office. In preferred embodiments of the present invention, the switch 200 provides an open circuit in which the wires of the wire pair are galvanically isolated to break the circuit and provide an open circuit for testing which provides no electron flow. Such galvanic isolating switches include, for example, such as relays. In contrast, solid state or semiconductor devices, such as thyristors, typically have distortion characteristics which, particularly under high frequency testing conditions, may allow current flow making the semiconductor devices themselves detectable to the test procedures during the open circuit test conditions. In various embodiments of the present invention as will be described herein, the switch 200 is a latching relay such as a bistable relay.

As illustrated in the embodiments of FIG. 2, the test circuit further includes an energy storage cell 210 that is electrically coupled across the wires of the line in wire pair through the switch 200. Thus, the electrical coupling of the energy storage cell 210 to the line in wire pair allows charging of the energy storage cell 210 from the line in wire pair when the switch 200 is in the second position. Furthermore, as shown in FIG. 2, the energy storage cell 210 provides the power supply utilized to power the switch 200 during switching between the first and second positions. The energy storage cell 210 may be a capacitor, such as a discrete capacitor or a battery storage cell configured to be charged by current flow from the line in wire pair. The energy storage cell 210, as shown in the embodiments of FIG. 2, is electrically decoupled from at least one of the wires of the wire pair in the first position of the switch (relay) 200 so as not to charge the energy storage cell 210 when the relay 200 is in the first position.

The test circuit illustrated in FIG. 2 further includes an energy monitor circuit 215 electrically coupled to the energy storage cell 210 so as to detect an energy level of the energy storage cell. As shown in the embodiments of FIG. 2, the energy monitor circuit 215 both monitors the energy level of the energy storage cell 210 as well as drawing its own power supply from the energy storage cell 210. The energy monitor circuit 215 may be a micropower circuit to reduce the amount of energy from the energy storage cell 210 required to operate the energy monitor circuit 215 while the relay 200 is in the first (open) circuit position decoupling energy charge flow from the line in wire pair to the energy storage cell 210.

A switch control circuit 220 is configured to switch the relay 200 from the first position to the second position responsive to the energy monitor circuit 215. For example, responsive to a control level signal for set and/or reset from the energy monitor circuit 215, the switch control circuit 220 may activate set or reset coils of the relay 200. The switch control circuit 220 may, thus, switch the relay 200 from the first position to the second position at a reset level and from the second position to the first position at a set level greater than the reset level. Thus, as used for purposes of the description herein, the first position of the relay 200 corresponds to the open circuit position which is selected by the set control output from the switch control circuit 220. Correspondingly, the second position places the test circuit in the line in circuit to allow current flow is selected by the reset control signal from the switch control circuit 220.

Figure 3:
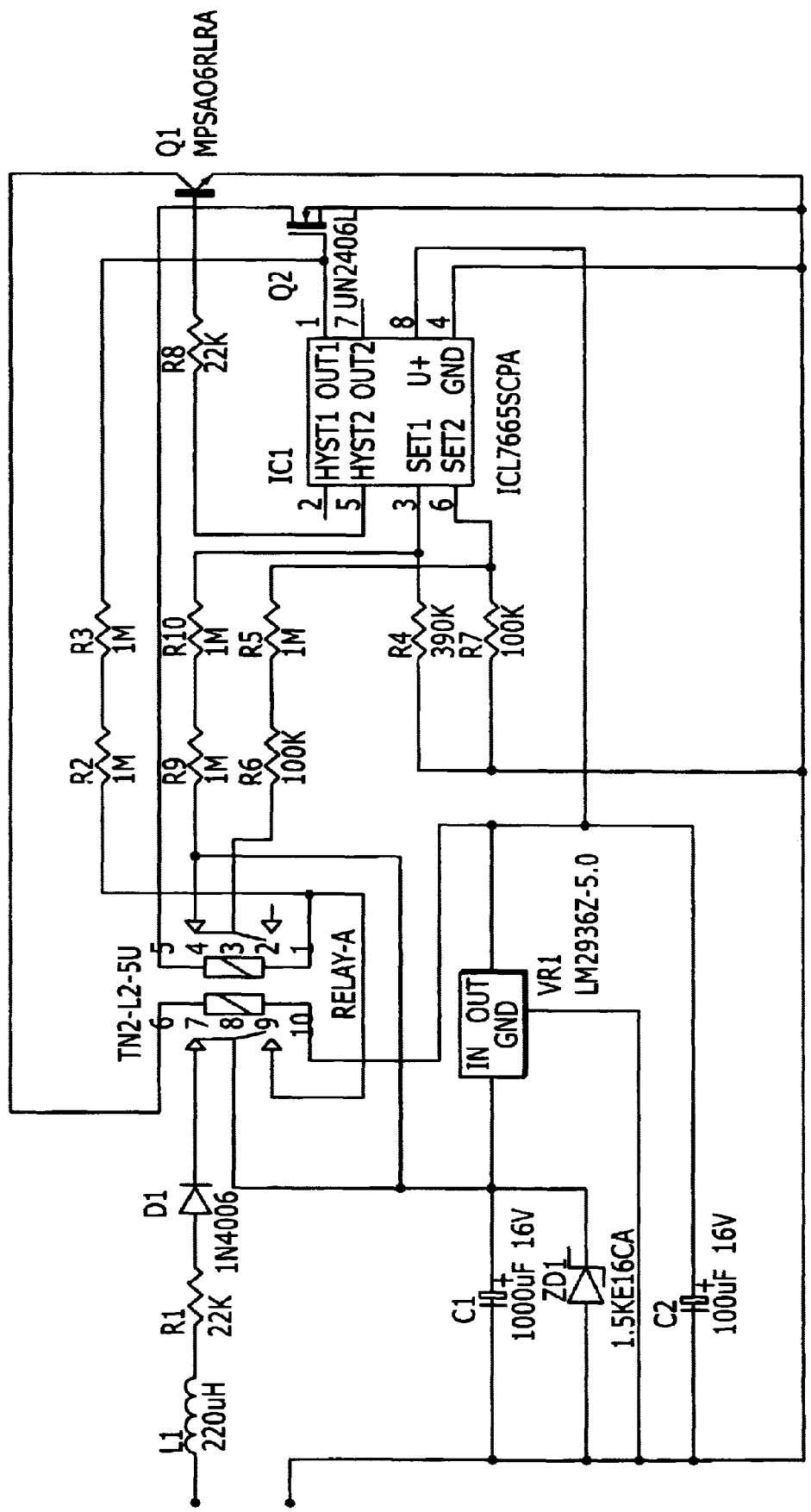
FIG. 3 is a circuit diagram of a telecommunications conductor wire pair test circuit according to embodiments of the present invention.
Figure 4:
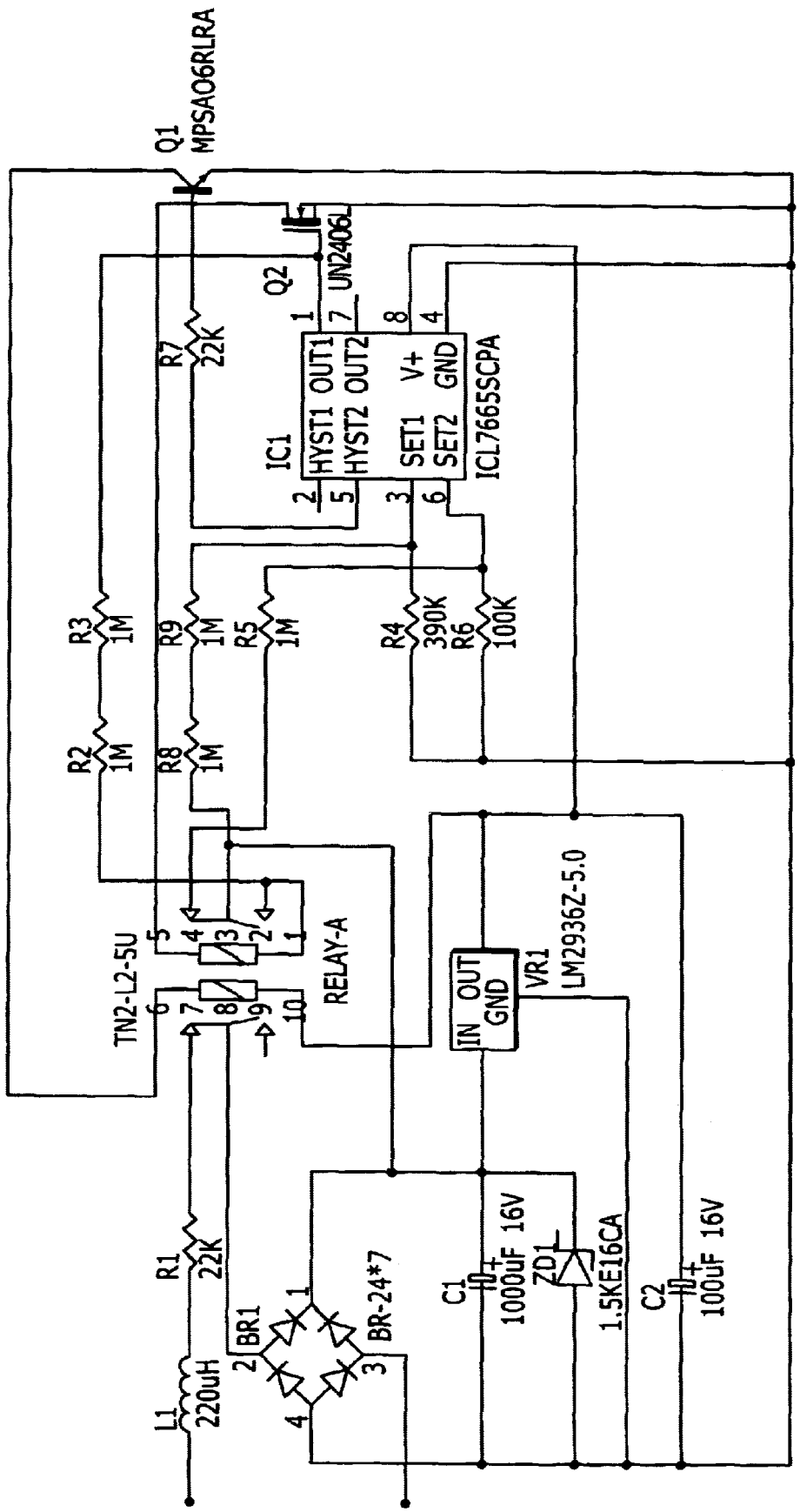
FIG. 4 is a circuit diagram of a telecommunications conductor wire pair test circuit according to further embodiments of the present invention.

Further embodiments of a telecommunications conductor wire pair test circuit according to the present invention will now be described with reference to FIG. 3. Note that the component values shown in FIGS. 3 and 4 are merely provided for the purposes of explaining the present invention and the present invention is not limited to circuits using such components. As shown in FIG. 3, a first one of the wire pair, which will be referred to for convenience as the ring conductor (or line) herein, is electrically coupled to a first switched input pin 7 of RELAY-A. The ring signal is connected through a signal conditioning circuit including inductor L1 (shown as 220uH in FIG. 3), resistor R1 (shown as 22K in FIG. 3) and diode D1 (shown as 1N4006 in FIG. 3). The embodiments illustrated in FIG. 3 provide a test circuit responsive to a positive bias voltage between the ring line and the tip line and may include the diode D1 to prevent current flow under reverse bias conditions. Diode D1 may be a zener diode. The inductor L1 may be provided where an overvoltage protection device, such as a gas tube, is provided upstream of the test circuit to absorb events, such as lightning strikes. Such devices typically have set trigger voltages where they absorb excess current flow which trigger voltages may be at or above the operating voltage of the test circuit. Accordingly, the inclusion of the inductor L1 may assist in insuring current flow through such gas tube overvoltage protection devices to provide protection for the test circuit of the present invention.

The tuning resistor R1 may be selected to provide a desired charge/discharge time for charging/discharging the energy storage cell capacitor C1 (shown as 1000 uF 16V in FIG. 3) to the set level while the first relay (RELAY-A) (shown as TN2-L2-5V in FIG. 3) is in the second position as illustrated in FIG. 3. The energy storage cell capacitor C1 may further be selected to provide a desired discharge time for draining the capacitor C1 to the reset level while the capacitor C1 is powering the test circuit with the first relay of RELAY-A in the first position (the opposite from as shown in FIG. 3, i.e., pins 7 and 8 of RELAY-A disconnected and pins 8 and 9 of RELAY-A connected). It is further to be understood that the selection of the capacitance of capacitor C1 may also affect the charge time (in the second position shown in FIG. 3) for the capacitor C1 in combination with the selection of the resistor R1.

As shown in the embodiments of FIG. 3, the capacitor C1 is coupled to a voltage regulator VR1 (shown as LM2936Z-5.0 in FIG. 3), the output of which provides a power supply to the energy monitor circuit IC1 (shown as ICL7665SCPA in FIG. 3) as well as the RELAY-A. The zener diode ZD1 (shown as 1.5KE16CA in FIG. 3) and the capacitor C2 (shown as 100uF 16 V in FIG. 3) are provided for overvoltage protection and filtering as will be understood by one of skill in the art in viewing the layout of FIG. 3.

Operations of the energy monitor circuit IC1 in cooperation with the switch control circuit components Q1 (shown as MPSA06RLRA in FIG. 3) and Q2 (shown as UN2406L in FIG. 3) will now be further described. As a preliminary matter, note that the RELAY-A shown in FIG. 3 includes both a first relay having an output at pin 8 and a first and second switched input at pins 7 and 9 respectively and a second relay having an output at pin 3 and a first and second switched input at pins 4 and 2 respectively. Such a configuration may be provided, for example, by a bistable rocker arm type mechanical relay wherein the set and reset powering coils for both switching circuits are common as shown in FIG. 3. In other words, activation of the reset coil connects pin 8 to pin 7 and pin 3 to pin 4 as shown in FIG. 3. Activation of the set coil connects pin 8 to pin 9 and pin 3 to pin 2.

As shown in the embodiments of FIG. 3, the energy monitor circuit IC1 may be an ICL 7665 SCPA micropower circuit which may be used, for example, in a cell phone battery charger control circuit. Thus, IC1 as shown in FIG. 3 includes two monitor (or set) circuits each of which has a direct output and an output with a hysteresis characteristic determined by the chip configuration. Both of the separate circuits of the IC1 are utilized in the illustrated embodiments of FIG. 3. The test provides a first monitor circuit that controls switching of the relay from the first position (not shown) to the second position (shown) by driving the reset switch control circuit transistor Q2 during falling energy level transitions. The second monitor circuit of IC1 controls switching of the RELAY-A from the second position (shown) to the first position (not shown) during rising voltage conditions at the set level through the switch control transistor Q1.

As shown in FIG. 3, the hysteresis output HYST2 of pin 5 of IC1 is used to drive the transistor Q1 of the second monitor system and the hysteresis output out one of the first monitor circuit is used to drive the reset switch control transistor Q2. Both transistor Q1 and Q2 are shown in FIG. 3 as solid state devices with Q1 shown as a bipolar transistor and Q2 shown as a field effect transistor. Thus, the switch control circuit as shown in FIG. 3 includes the set switch circuit including transistor Q1 for switching the relay circuits of RELAY-A from the second position to the first position and a reset switch circuit including transistor Q2 that switches the relays of RELAY-A from the first position to the second position. The switching level for the first monitor circuit (the reset circuit for the embodiments shown in FIG. 3) may be selected by the values for resistors R9 (shown as 1M in FIG. 3), R10 (shown as 1M in FIG. 3) and R4 (shown as 390k in FIG. 3) which provide a voltage divider input to pin 3 of IC1. While three resistors are shown in the embodiments of FIG. 3, it is to be understood that a variety of configurations of voltage divider circuits may be used with the present invention. Similarly, the switching voltage set level for the second monitor circuit may be established by selection of values for the resistors R6 (shown as 100K in FIG. 3), R5 (shown as 1M in FIG. 3) and R7 (shown as 100K in FIG. 3) which provide a voltage divider circuit input to pin 6 of IC1. Resistors R2 (shown as 1M in FIG. 3) and R3 (shown as 1M in FIG. 3) act as pull up resistors for the control input gate of transistor Q2. Finally, resistor R8 (shown as 22K in FIG. 3) provides signal conditioning for the input to the gate of transistor Q1.

As will now be further described, operations of the relays of RELAY-A in accordance with the present invention control not only setting and resetting of the relay itself, but further select which portions of the test circuit are subject to current flow under various operating conditions. As used herein, the term "relay" refers to an assembly including coils and contacts or to the contacts. For example, for the exemplary RELAY-A device illustrated in FIG. 3, the respective ones of the relays refers to the first and second contacts operated by common set/reset coils. First, as described previously, the capacitor C1 providing the energy storage cell for control of switching of RELAY-A is coupled to the ring input line for purposes of charging in the second position (shown) by the connection between the output 8 and the first switched input 7. However, in the first position (not shown) the relay output 8 and, thus, the energy storage capacitor C1, are decoupled from the ring line input which decouples the current input source of the wire pair from the energy storage capacitor C1 in the first position.

The switching arrangement of the two relays provides further optional aspects in controlling the amount of current utilized by the test circuit while operating off of energy stored in the energy storage capacitor C1 as will be described herein. First, with respect to the first relay of RELAY-A, in addition to decoupling the ring line input in the first position, the first relay further connects the energy storage capacitor C1 to output pin 9 and thereby provides an energy source for operation of the transistor Q2 enabling it to activate the reset coil while voltage in the test circuit is decreasing (as a result of discharging of the energy storage capacitor C1 while in the first position) but preventing triggering of the reset coil when the reset level is reached and passed during charging of the capacitor C1 while the relay is in the second position shown in FIG. 3.

Further control of current utilization is provided by the second relay of the RELAY-A. As shown in FIG. 3, in the illustrated second position with the output pin 3 disconnected from pin 2 and connected to pin 4, the voltage signal from the energy storage capacitor C1 is detected by not only the voltage divider circuit of resistors R9, R10 and R4 connected to pin 4 of RELAY-A, but also through the connection between pin 4 and pin 3 of RELAY-A, to the voltage divider R6, R5 and R7 of the second monitor circuit. However, in the first position (not shown) where the test circuit is operating by discharging the energy from the energy storage capacitor C1, pin 3 of RELAY-A is not connected to pin 4 so that there is no current flow through the voltage divider circuit R6, R5 and R7 of the second monitor circuit. Thus, the second monitor circuit is not activated and does not draw current from the energy storage capacitor C1 while RELAY-A is in the first position (not shown) and while the monitored voltage is decreasing from a high to a lower level where it is desired to control switching operations utilizing the first monitor circuit rather than the second monitor circuit.

For the circuit illustrated in FIG. 3 using the component values shown for the various components and applying a typical 48 volt line voltage, approximately 20 seconds is available from the time the 48 volt bias is applied before RELAY-A triggers to provide an open circuit for testing. Approximately 6 minutes of operation is typically provided in the open circuit mode to allow open circuit line testing and conditioning of the DSL dedicated communication lines before the voltage level detected at the energy storage capacitor C1 drops to a reset level selected to insure that sufficient energy will remain in the energy storage capacitor C1 to allow successful operation of the reset circuitry so as to return the circuit to the second position illustrated in FIG. 3. It is to be understood, however, that these particular time out values may be affected by various environmental and component operating conditions as well as by selection of the values of various components such as the capacitance of capacitor C1 and the resistance of resistor R1 as well as the micropower characteristics of the various devices such as IC1 and VR1 operated utilizing energy from the capacitor C1 while the circuit is in the first position (not shown).

Furthermore, it is to be understood that as described herein, use of a first monitor circuit of IC1 is provided to control switching of RELAY-A from the first position to the second position while the second monitor circuit controls switching of RELAY-A from the second position to the first position. Similarly, the second relay of RELAY-A operates to, effectively, deactivate the second monitor circuit of IC1 when RELAY-A is in its first position. While the first monitor circuit in the illustrated embodiments is not deactivated in either position, as described above, the current input source to the reset switch circuit including the transistor Q2 is decoupled by decoupling from the energy storage capacitor C1 through the first relay of RELAY-A.

RELAY-A further provides a galvanically isolated open circuit across the line input wire pair in the first position (not shown) by disconnecting the ring input at pin 7 of RELAY-A from the output at pin 8 of RELAY-A.

Further embodiments of a test circuit according to the present invention will now be described with reference to the circuit diagram illustration of FIG. 4. Like designated devices shown in FIG. 4 correspond to those shown in the embodiments of FIG. 3 and operate in substantially the same manner as was described with reference to the embodiments of FIG. 3. Accordingly, the description of the embodiments of FIG. 4 will be directed to differences between the embodiments of FIG. 4 and FIG. 3. In particular, the embodiments illustrated in FIG. 4 include a bridge rectifier circuit BR1 (shown as BR-24*7 in FIG. 4) electrically coupled between the tip line of the wire pair and the first relay of RELAY-A. The bridge rectifier circuit BR1 further couples to provide current feed to the energy storage capacitor C1. Accordingly, the use of the bridge rectifier circuit BR1 as shown in the embodiments of FIG. 4 provides a test circuit according to the present invention which is responsive to both positive and negative polarity signals across the wire pair. Various other distinctions in the circuit diagrams shown in FIG. 3 and FIG. 4 flow from this distinction. For example, the diode D1 is no longer present on the ring line input. The switching of the current source from the energy storage capacitor C1 to the second switch control circuit including transistor Q2 is provided through the second relay of RELAY-A rather than the first relay of RELAY-A as shown in the embodiment of FIG. 3. In other words, pin 2 of RELAY-A is utilized in the current source switching and pin 9 of the first relay of RELAY-A is not utilized.

Figure 5:
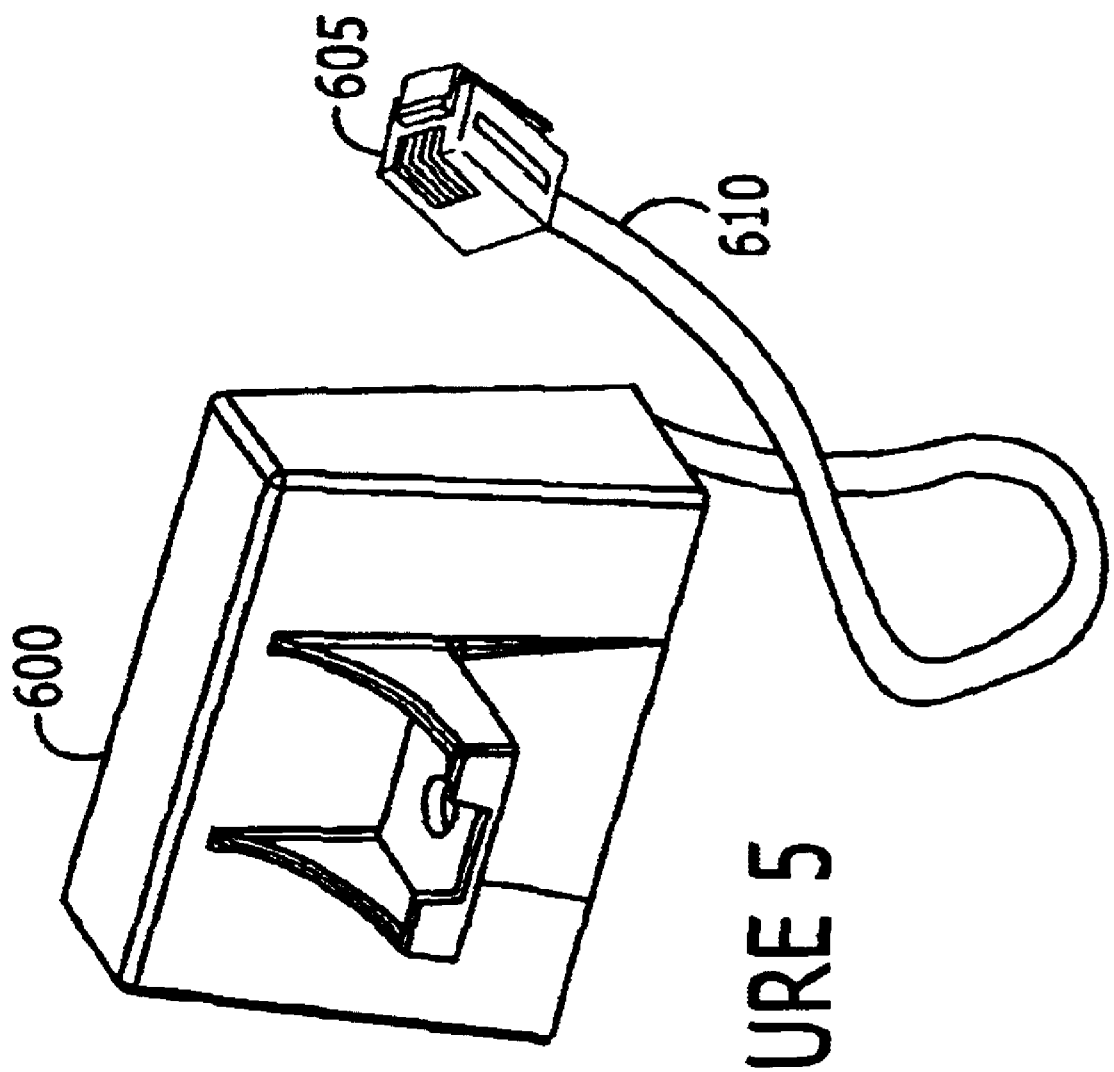
FIG. 5 is a perspective view of a telecommunications conductor wire pair test circuit including an RJ-type connector pigtail according to embodiments of the present invention.

Referring now to the perspective view illustration of FIG. 5, embodiments of a test circuit according to the present invention configured for use with a test jack of a customer NID will be further described. The test circuit 600 includes a jumper cable 610, carrying the wire pair to be tested. The jumper wire 610 terminates in an RJ-type connector 605. Thus, installation of the test circuit 600 may be provided at the NID 40 by unplugging an existing jumper demarcation point cable in the NID 40 and inserting the RJ-type connector 605 into the RJ-type test port. This approach not only provides correct connection of the test circuit 600 to the incoming wire pair, but also may assure an open circuit at the customer premises downstream of the test circuit 600. Thus, the open circuit characteristics of the test circuit 600 will not be obviated by a conducting path through a customer device connected to the telecommunications conductor wire pair downstream of the test circuit 600.

Operations for testing a telecommunications conductor wire pair according to embodiments of the present invention will now be described with reference to the flowchart illustration of FIG. 6. It is to be understood that, while the methods of the present invention may be accomplished utilizing the embodiments of the test circuit blocks of the present invention shown in the Figures, other hardware may be utilized in keeping with the methods of the present invention. Operations begin at block 700 by providing a switching test circuit connecting to the wire pair under test. For example, as described with reference to FIG. 5, the switching test circuit 600, may be plugged into the test jack at the NID 40. In various embodiments of the present invention, a voltage may not be present on the wire pair at the time of installation of the switching test circuit and the voltage may subsequently be applied to the wire pair (block 705). The energy storage cell of the test circuit is charged with energy carried by the wire pair (block 710). As part of the test procedure, the test circuit itself may be detected while the connection of the test circuit is closed to allow charging (block 715), for example, the current flow to charge the energy storage capacitor may be detected from the central office of the telephone company.

The energy level of the energy storage cell is monitored during charging, for example, using the voltage detection circuitry shown in FIGS. 3–4 (block 720). Once a set energy level of the energy storage cell is detected during charging of the energy storage cell (block 720), the connection of the test circuit to one or both of the wires of the wire pair is opened which interrupts charging of the energy cell (block 725). In various environments, the test procedure includes detecting the open circuit across the wire pair while the connection of the test circuit is open before initiating open circuit based testing (block 730). While the test circuit is in the open circuit condition (block 730), the telecommunications conductor wire pair may be tested (block 735).

The energy level of the energy storage cell is further monitored during the open circuit conditions while the energy level is falling as the capacitor discharges to power the monitoring circuit (block 740). When a reset energy level of the energy storage cell is detected during discharging of the energy storage cell (block 740), the connection of the test circuit to one or both of the wires of the wire pair is closed using energy stored in the energy storage cell (block 745). Thus, the time available for open circuit testing of the wire pair may be maximized while monitoring the level of energy in the energy storage cell in an attempt to ensure that sufficient energy will remain in the cell to operate the reset coil of the relay to reset the test circuit and allow recharging of the energy storage capacitor.

In a further method aspect of the present invention where, for example, the diode D1 is a zener diode, the energy storage cell C1 may be forced to at least partially discharge to an initial condition for testing as described above with reference to FIG. 6. The zener diode has a reverse breakdown voltage. A voltage at a first polarity is applied to the wire pair. The test circuit is detected while the connection of the test circuit is closed. The voltage is removed before the connection of the test circuit is open. A voltage at a reverse polarity is applied to the wire pair. The sum of the applied voltages in the forward and reverse polarity is greater than the reverse breakdown voltage of the zener diode.

As noted above, in various embodiments of the present invention, the relay utilized for switching of the test circuit is a latching relay. By utilizing a latching relay, the energy storage capacitor need not power the relay during the open circuit test condition. This, combined with the use of micropower devices for the energy monitor circuit and voltage regulator which must be powered by the energy storage cell during the open circuit test conditions, extends the operating time available for a given capacitor size, thus, increasing the available test time for open circuit testing without requiring undue increases in the size of the storage capacitor. Furthermore, the use of detection of a determined reset level during falling energy conditions while the test circuit is in the open circuit test condition may provide increased reliability of initiating reset of the relay while there is still sufficient energy to successfully reset the relay. While a galvanically isolating relay switch may be used in accordance with various embodiments of the present invention without the use of energy monitor based initiation of reset of the relay (for example, by the use of a predetermined reset time) such an approach may be less reliable, require a larger storage capacitor and/or require a shorter available open circuit test time in light of the variability of environmental conditions and variations in component device characteristics.

Figure 6:
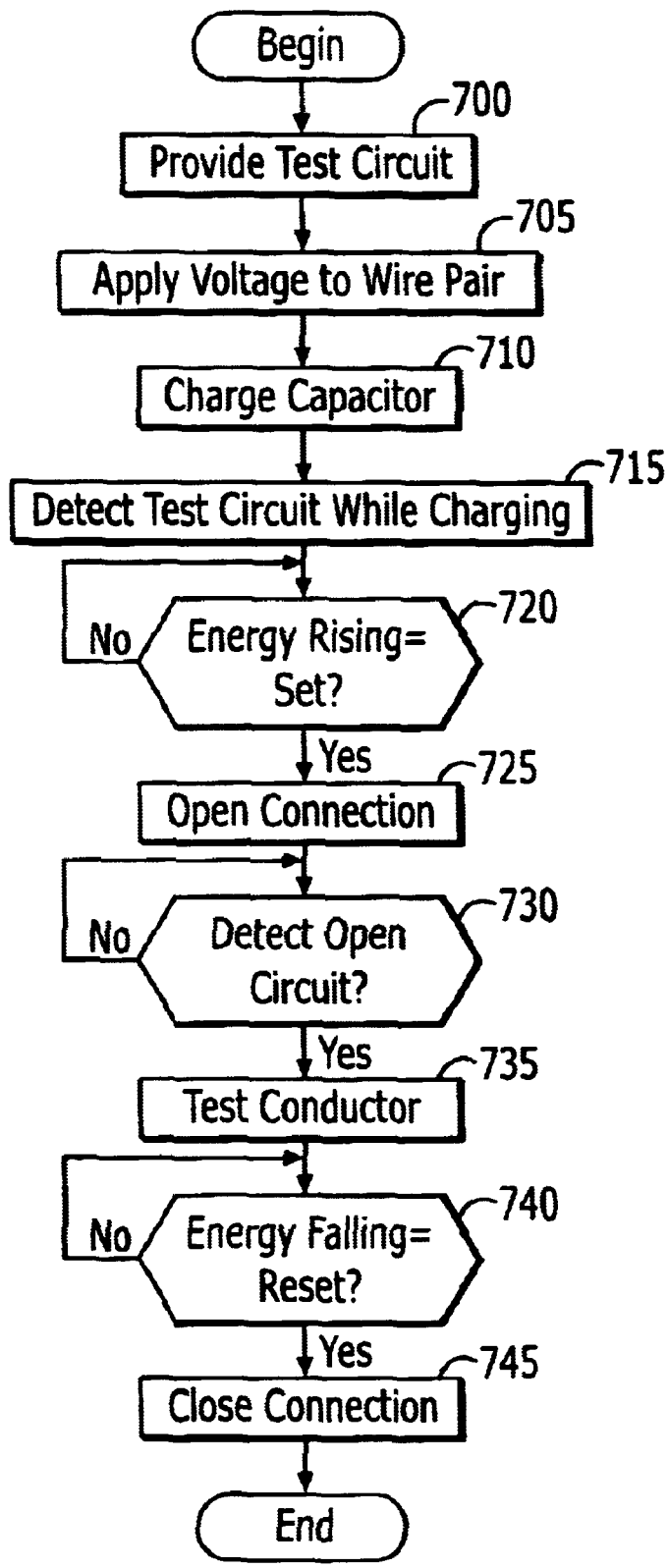
FIG. 6 is a flowchart illustrating operations for testing a telecommunications conductor wire pair according to embodiments of the present invention.

It will be understood that blocks of the flowchart illustration of FIG. 6 and of the block diagram and circuit diagram illustrations of FIGS. 2–3 and combinations of blocks in the flowchart illustration and block diagrams may be implemented using discrete and integrated electronic circuits. It will also be appreciated that blocks of the flowchart illustration of FIG. 6 and of the block diagram illustration of FIGS. 2–3, and combinations of blocks in the flowchart illustration and block diagrams may be implemented using components other than those illustrated in FIGS. 2–6, and that, in general, various blocks of the flowchart illustration and block diagrams and combinations of blocks in the flowchart illustration and block diagrams, may be implemented in special purpose hardware such as discrete analog and/or digital circuitry, combinations of integrated circuits or one or more application specific integrated circuits (ASICs), as well as by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions specified in the flowchart block or blocks.

Accordingly, blocks of the flowchart illustration of FIG. 6 support electronic circuits and other means for performing the specified functions, as well as combinations of operations for performing the specified functions. It will be understood that the circuits and other means supported by each block of the flowchart illustration of FIG. 6, and combinations of blocks therein, can be implemented by special purpose hardware, software or firmware operating on special or general purpose data processors, or combinations thereof.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included Within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A telecommunications conductor wire pair test circuit comprising:
    a switch electrically coupled to the wire pair and having a first position in which the test circuit provides an open circuit across the wires of the wire pair and a second position in which the test circuit is detectable across the wires of the wire pair;
    an energy storage cell that is electrically coupled across the wires of the wire pair so as to charge the energy storage cell when the switch is in the second position, the switch being powered by the energy storage cell;
    an energy monitor circuit electrically coupled to the energy storage cell so as to detect an energy level of the energy storage cell; and
    a switch control circuit configured to switch the switch from the first position to the second position responsive to the energy monitor circuit.

2. The test circuit of claim 1 wherein the switch comprises a relay.

3. The test circuit of claim 1 wherein the switch comprises a latching relay.

4. The test circuit of claim 3 wherein the energy monitor circuit comprises a micropower circuit powered by the energy storage cell.

5. The test circuit of claim 4 wherein the energy storage cell is electrically decoupled from at least a first one of the wires of the wire pair in the first position so as not to charge the energy storage cell when the relay is in the first position and wherein the switch control circuit switches the relay from the first position to the second position at a reset level and wherein the switch control circuit is further configured to switch the relay from the second position to the first position responsive to the energy monitor circuit at a set level, the set level being greater than the reset level.

6. The test circuit of claim 5 wherein the energy monitor circuit comprises a first monitor circuit that controls switching of the relay from the first position to the second position and a second monitor circuit that controls switching of the relay from the second position to the first position.

7. The test circuit of claim 6 further comprising a second relay having a first position that deactivates the second monitor circuit when the first relay is in its first position and a second position when the first relay is in its second position.

8. The test circuit of claim 7 wherein the switch control circuit comprises a set switch circuit that switches the first and second relay from the second position to the first position and a reset switch circuit that switches the first and second relay from the first position to the second position and wherein a current input source of the reset switch circuit is decoupled from the energy storage cell by at least one of the first or second relay in the second position and coupled to the energy storage cell in the first position.

9. The test circuit of claim 8 wherein the second monitor circuit has a determined hysteresis.

10. The test circuit of claim 8 wherein the set switch circuit and the reset switch circuit comprise solid state switch devices.

11. The test circuit of claim 7 further comprising a signal conditioning circuit coupling the first one of the wires to the first relay.

12. The test circuit of claim 11 wherein the energy storage cell is a capacitor having a capacitance selected to provide a determined discharge time for draining the capacitor to the reset level while powering the test circuit while the first relay is in the first position and selected to provide a determined charge time for charging the capacitor to the set level while the first relay is in the second position.

13. The test circuit of claim 12 wherein the s signal conditioning circuit further comprises a tuning resistor selected to provide the determined charge time for charging the capacitor to the set level while the first relay is in the second position.

14. The test circuit of claim 12 further comprising a bridge rectifier circuit electrically coupled between one of the wires of the wire pair and the first relay so that the test circuit is responsive to positive and negative polarity signals across the wire pair.

15. The test circuit of claim 4 further comprising a voltage regulator electrically coupled between the energy storage cell and the energy monitor circuit.

16. The test circuit of claim 3 wherein t he latching relay includes an output electrically coupled to a first one of the wires of the wire pair through the energy storage cell and wherein a first switched input is connected to a second one of the wires of the wire pair, the output being connected to the first switched input in the second position so as to charge the energy storage cell when the relay is in the first position and disconnected from the first switched input in the first position so as to provide a galvanically isolating open circuit across the wire pair.

17. A telecommunications conductor wire pair test circuit comprising:
a relay electrically coupled to the wire pair and having a first position in which the test circuit provides an open circuit across the wires of the wire pair and a second position in which the test circuit is detectable across the wires of the wire pair;
an energy storage cell that is electrically coupled across the wires of the wire pair so as to charge the energy storage cell when the relay is in the second position, the relay being powered by the energy storage cell;
a switch control circuit configured to switch the relay from the first position to the second position; and
wherein the relay includes an output electrically coupled to a first one of the wires of the wire pair through the energy storage cell and wherein a first switched input is connected to a second one of the wires of the wire pair, the output being connected to the first switched input in the second position so as to charge the energy storage cell when the relay is in the second position and disconnected from the first switched input in the first position so as to provide a galvanically isolating open circuit across the wire pair.

18. The test circuit of claim 17 wherein the energy storage cell is electrically decoupled from at least a first one of the wires of the wire pair in the first position so as not to charge the energy storage cell when the relay is in the first position.

19. The test circuit of claim 18 wherein the switch control circuit comprises a set switch circuit that switches the relay from the second position to the first position and a reset switch circuit that switches the relay from the first position to the second position.

20. The test circuit of claim 19 wherein a current input source of the reset switch circuit is decoupled from the energy storage cell in the second position and coupled to the energy storage cell in the first position.

21. The test circuit of claim 20 wherein the switch control circuit has a determined hysteresis.

22. The test circuit of claim 17 further comprising a bridge rectifier circuit electrically coupled between one of the wires of the wire pair and the relay so that the test circuit is responsive to positive and negative polarity signals across the wire pair.

23. A method for testing a telecommunications conductor wire pair comprising the steps of:
providing a switching test circuit connected to the wire pair;
charging an energy storage cell of the test circuit with energy carried by the wire pair;
monitoring an energy level of the energy storage cell;
opening the connection of the test circuit to at least one of the wire pair to interrupt charging of the energy cell responsive to detection of a set energy level of the energy storage cell during charging of the energy storage cell; and
closing the connection of the test circuit to the at least one of the wire pair using energy stored in the energy storage cell to allow re-charging of the energy storage cell responsive to detection of a reset energy level of the energy storage cell during discharging of the energy storage cell.

24. The method of claim 23 wherein the switching test circuit further comprises a latching relay and wherein the step of opening the connection further comprises the step of opening the connection of the test circuit using the latching relay to so as to provide a galvanically isolating open circuit across the wire pair.

25. The method of claim 24 further comprising the steps of:
applying a voltage to the wire pair;
detecting the test circuit while the connection of the test circuit is closed;
detecting the open circuit across the wire pair while the connection of the test circuit is open;
testing the telecommunications conductor wire pair while the connection of the test circuit is open; and
removing the test circuit.

26. The method of claim 24 wherein the switching test circuit further comprises a zener diode having a reverse breakdown voltage connected at an input of at least one of the wire pair to the test circuit, the method further comprising the steps:
applying a voltage at a first polarity to the wire pair;
detecting the test circuit while the connection of the test circuit is closed;
removing the voltage before the connection of the test circuit is open; and
applying a voltage at a reverse polarity to the wire pair, the sum of the applied voltages being greater than the reverse breakdown voltage of the zener diode.

27. A telecommunications conductor wire pair test circuit comprising:
a relay electrically coupled to the wire pair and having a first position in which the test circuit is decoupled from the wires of the wire pair and a second position in which the test circuit is detectable across the wires of the wire pair;
an energy storage cell that is electrically coupled across the wires of the wire pair so as to charge the energy storage cell when the relay is in the second position, the relay being powered by the energy storage cell; and
a switch control circuit configured to switch the relay from the first position to the second position wherein the switch control circuit is powered by the energy storage cell in the first position.

28. The test circuit of claim 27 wherein the energy storage cell is electrically decoupled from at least a first one of the wires of the wire pair in the first position so as not to charge the energy storage cell when the relay is in the first position and wherein the switch control circuit switches the relay from the first position to the second position at a reset level and wherein the switch control circuit is further configured to switch the relay from the second position to the first position at a set level, the set, level being greater than the reset level.

29. The test circuit of claim 28 wherein the energy storage cell is a capacitor having a capacitance selected to provide a determined discharge time for draining the capacitor to the reset level while powering the test circuit while the relay is in the first position and selected to provide a determined charge time for charging the capacitor to the set level while the relay is in the second position.

30. The test circuit of claim 18 wherein the energy storage cell powers the relay in the first position.

31. The test circuit of claim 30 wherein the energy storage cell powers the relay and the switch control circuit for at least about six minutes in the first position.

32. The test circuit of claim 30 wherein the energy storage cell powers the switch control circuit in the first position.

33. A method for testing a telecommunications conductor wire pair comprising the steps of:

disconnecting a customer telecommunications conductor wire pair from a central office telecommunications conductor wire pair;

connecting a test circuit to the central office telecommunications wire pair;

charging an energy storage cell of the test circuit with energy carried by the wire pair to allow detection of the test circuit from the central office;

automatically disconnecting the test circuit from the central office telecommunications wire pair to provide an open circuit across the central office telecommunications wire pair; and then automatically reconnecting the test circuit to the central office telecommunications wire pair a selected time after disconnecting the test circuit.

* * * * *